(12) United States Patent
Arai (10) Patent No.: US 9,767,579 B2
(45) Date of Patent: Sep. 19, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kimiyoshi Arai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/986,828

(22) Filed: Jan. 4, 2016

(65) Prior Publication Data

US 2017/0032218 A1  Feb. 2, 2017

(30) Foreign Application Priority Data

Jul. 27, 2015  (JP) ................. 2015-147469

(51) Int. Cl.
  *G06K 9/62* (2006.01)
  *G06T 11/00* (2006.01)
  *G06K 9/00* (2006.01)

(52) U.S. Cl.
  CPC .......... *G06T 11/00* (2013.01); *G06K 9/00677* (2013.01); *G06K 9/62* (2013.01)

(58) Field of Classification Search
  CPC .......... H04N 1/00132; H04N 1/00196; H04N 1/32101; H04N 1/387; H04N 2201/3214; H04N 2201/3225; G06K 9/00597; G06K 9/00617; G06K 9/6212; G06K 2209/25; G06K 9/00684; G06K 9/6218; G06K 9/00228; G06K 9/3233; G06K 9/6255; G06K 9/00463; G06K 9/00456; G06K 9/2054; G06K 2009/6213; G06K 9/6215; G06T 3/00; G06T 7/0081; G06T 2207/10024; G06T 7/0002; G06T 7/0044; G06T 2207/10008; G06T 7/0085; G06T 11/00; G06F 17/30244; G06F 17/30259; G06F 3/013; G06F 17/30424; G06F 17/30011; G06F 17/211; G06F 17/30017;
  (Continued)

(56) References Cited

U.S. PATENT DOCUMENTS 5,822,454 A * 10/1998 Rangarajan .......... G06K 9/2054
                                                                    382/176
5,845,048 A * 12/1998 Masumoto ............. B25J 9/1697
                                                                      706/20

(Continued)

FOREIGN PATENT DOCUMENTS

JP    2006-338592 A    12/2006

*Primary Examiner* — Vu Le
*Assistant Examiner* — Aklilu Woldemariam
(74) *Attorney, Agent, or Firm* — Sughrue Mion, PLLC (57) ABSTRACT

An information processing apparatus includes a memory, an accepting unit, a determining unit, and a selecting unit. The memory stores a template collection. The memory associatively stores, for each template, the template and a degree of first impression similarity indicating an impression of the template. The accepting unit accepts an image. The determining unit determines an impression of the accepted image. The selecting unit selects, from the template collection, a template that is in harmony with the image by using a degree of second impression similarity indicating the impression of the image, and the degree of first impression similarity.

11 Claims, 10 Drawing Sheets

(58) Field of Classification Search
CPC ........... Y10S 707/99931; G10L 15/063; G10L 17/04; G06Q 30/0603; G06Q 30/0601; G06Q 30/0621; G07D 7/2025; A61C 9/004; A61C 13/0004; A61B 6/5235; G09B 23/286; G09B 5/062
USPC ....... 382/176, 180, 181, 219, 289, 100, 117, 382/118, 165, 209, 224
See application file for complete search history.

(56) References Cited

U.S. PATENT DOCUMENTS

| | | | |
|---|---|---|---|
| 6,647,153 B1 * | 11/2003 | Ito | G06T 11/60 358/450 |
| 7,249,116 B2 * | 7/2007 | Fiske | G06N 99/005 706/12 |
| 8,880,540 B1 * | 11/2014 | Sampson | G06K 9/00463 707/756 |
| 9,116,924 B2 * | 8/2015 | Marchesotti | G06F 17/30274 |
| 9,201,773 B1 * | 12/2015 | Cohen | G06F 11/3684 |
| 2004/0102958 A1 * | 5/2004 | Anderson, IV | G06F 17/2775 704/4 |
| 2006/0221779 A1 * | 10/2006 | Matsushita | G06F 17/3028 369/30.01 |
| 2006/0279555 A1 * | 12/2006 | Ono | G06F 17/30247 345/173 |
| 2006/0280425 A1 | 12/2006 | Morita | |
| 2009/0152357 A1 * | 6/2009 | Lei | G06F 17/30011 235/454 |
| 2010/0217684 A1 * | 8/2010 | Melcher | G06Q 30/0603 705/26.1 |
| 2011/0032566 A1 * | 2/2011 | Sato | H04N 1/00222 358/1.15 |
| 2013/0050747 A1 * | 2/2013 | Cok | H04N 1/00167 358/1.15 |
| 2013/0207779 A1 * | 8/2013 | Uno | G06F 21/32 340/5.82 |
| 2015/0078629 A1 * | 3/2015 | Gottemukkula | G06K 9/0061 382/117 |

* cited by examiner

FIG. 14

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-147469 filed Jul. 27, 2015.

BACKGROUND (i) Technical Field

The present invention relates to an information processing apparatus, an information processing method, and a non-transitory computer readable medium.

(ii) Related Art

There are cases in which an image is combined with a template representing an illustration or a landscape. For example, there is a case in which a captured image is combined with a template, and the result is printed. There are other cases in which a template such as an ad, direct mail (DM), a poster, a postcard, or a catalogue is prepared in advance, and an image is combined with that template.

By the way, in the case of conducting a search for a template by using the date and time at which an image has been captured or the position at which an image has been captured (such as Global Positioning System (GPS) information), a template that suits the design of that image is not always retrieved by the search.

SUMMARY

According to an aspect of the invention, there is provided an information processing apparatus including a memory, an accepting unit, a determining unit, and a selecting unit. The memory stores a template collection. The memory associatively stores, for each template, the template and a degree of first impression similarity indicating an impression of the template. The accepting unit accepts an image. The determining unit determines an impression of the accepted image. The selecting unit selects, from the template collection, a template that is in harmony with the image by using a degree of second impression similarity indicating the impression of the image, and the degree of first impression similarity.

BRIEF DESCRIPTION OF THE DRAWINGS

An exemplary embodiment of the present invention will be described in detail based on the following figures, wherein.

DETAILED DESCRIPTION

Figure 1:
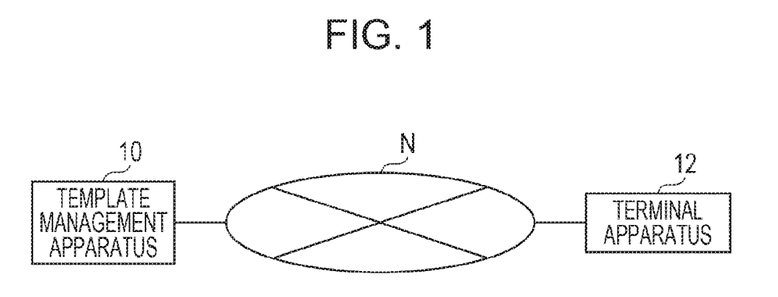
FIG. 1 is a block diagram illustrating a template management system according to an exemplary embodiment of the present invention.

FIG. 1 illustrates an exemplary template management system serving as an information processing system according to an exemplary embodiment of the present invention. The template management system includes a template management apparatus 10 serving as an information processing apparatus, and a terminal apparatus 12. The template management apparatus 10 and the terminal apparatus 12 are connected to a communication path N such as a network. Although one terminal apparatus 12 is connected to the communication path N in the example illustrated in FIG. 1, multiple terminal apparatuses 12 may be connected to the communication path N.

The template management apparatus 10 has the function of managing a template for generating a compilation, and, in response to a request, providing the template. A compilation includes, for example, an ad, direct mail (DM), a poster, a postcard, a catalogue, other documents, and/or other images. A template is model data for generating that compilation. The template management apparatus 10 also has the function of transmitting/receiving data to/from another apparatus.

The terminal apparatus 12 is an apparatus such as a personal computer (PC), a tablet PC, a smart phone, or a mobile phone, and has the function of transmitting/receiving data to/from another apparatus. The terminal apparatus 12 is, for example, an apparatus used to generate a compilation using a template.

In the template management system according to the exemplary embodiment, at the time of editing a template, for example, data on the template is transmitted from the template management apparatus 10 to the terminal apparatus 12, and the template is displayed on the terminal apparatus 12. In response to an editing instruction given from the user using the terminal apparatus 12, the template is edited in accordance with the editing instruction using the template management apparatus 10 or the terminal apparatus 12.

Alternatively, the terminal apparatus 12 may be incorporated into the template management apparatus 10, and the terminal apparatus 12 and the template management apparatus 10 may be physically integrated as one apparatus.

Figure 2:
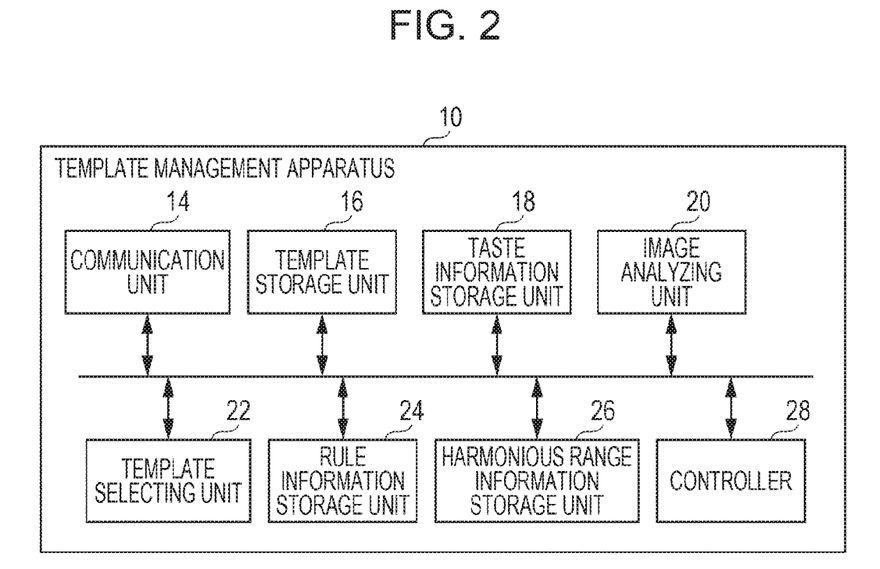
FIG. 2 is a block diagram illustrating a template management apparatus according to the exemplary embodiment.

Hereinafter, the configuration of the template management apparatus 10 will be described in detail. FIG. 2 illustrates the configuration of the template management apparatus 10.

A communication unit 14 is a communication interface, and has the function of transmitting data to another apparatus and receiving data from another apparatus via the communication path N. For example, the communication unit 14 transmits data on a template to the terminal apparatus 12, and receives image data transmitted from the terminal apparatus 12.

A template storage unit 16 is a storage device such as a hard disk, and stores data on a template. For example, multiple types of templates with different designs are generated in advance, and data on these templates is stored in advance in the template storage unit 16. For data on each template, template identification information for identifying that template (such as a template ID or a template name), template taste information, a template sensibility keyword, and sample information are associated in advance.

A template includes, for example, a background area, an image display area where an image is displayed, and a character string display area where a character string is displayed. An image or a figure, for example, is displayed in the background area and the image display area. The template includes, as the character string display area, for example, a title display area where a character string regarding a title is entered, a caption display area where a character string regarding a caption (description or the like) is entered, and a details display area where a character string regarding details is entered.

Template taste information is information indicating the taste (impression) of a template. The taste is, for example, determined in advance on the basis of a taste model that classifies an impression that a person has towards a target. In the taste model, impressions are classified into multiple types in accordance with the hue or tone of a target. The taste of a template is determined in accordance with the hue or tone of the template. For example, a dominant hue or tone of a template is determined, and the taste of the template is determined in accordance with the dominant hue or tone. For example, a taste map indicating a distribution of tastes is generated in advance, and template taste information is a taste value indicating a pair of coordinates on the taste map. The taste of a template may be determined in accordance with, for example, the layout of a later-described sample image or sample character string, the font size or type of the sample character string, or the size of the sample image. Note that the taste of a template corresponds to an example of a degree of first impression similarity.

A template sensibility keyword is a character string that indicates the taste of a template. A template sensibility keyword is, for example, a character string that indicates a taste corresponding to the above-mentioned taste value. Note that a template sensibility keyword corresponds to an example of a first sensibility keyword.

Sample information is, for example, character string data (sample character string) generated in advance as a sample, or image data (sample image). Both the sample character string and the sample image may be used as a sample, or only one of the sample character string and the sample image may be used as a sample. For sample information, sample identification information for identifying that sample (such as a sample ID or a sample name), sample taste information, a sample sensibility keyword, and information indicating the size of the sample on a template are associated in advance. In a template, for example, a sample character string may be entered in advance in the character string display area, or a sample image may be entered in advance in the image display area or the background area. Sample information is information whose editing by the user is permitted, and, when sample information is edited, a compilation that is based on a template is generated. A template may further include an area whose editing by the user is prohibited.

Sample taste information is information indicating the taste of a sample. The taste of a sample image is determined in accordance with, for example, a hue or a tone. The taste of a sample character string is determined in accordance with, for example, the size or type of a font. A sample sensibility keyword is a character string that indicates the taste of a sample. A sample sensibility keyword is, for example, a character string that indicates a taste corresponding to a taste value, like a template sensibility keyword.

A taste information storage unit 18 is a storage device such as a hard disk, and stores taste information. For taste information, taste identification information for identifying that taste (such as a taste ID or a taste name), information indicating a hue or a tone corresponding to the taste (such as a color palette), and a sensibility keyword indicating the taste are associated.

An image analyzing unit 20 has the function of determining the taste of an image of input image data by analyzing the image data, and generating image taste information and an image sensibility keyword indicating that taste. The image data is, for example, image data transmitted from the terminal apparatus 12. The image analyzing unit 20 obtains, for example, a dominant hue or tone of an image, and determines the taste of the image from the dominant hue or tone. Image taste information is, for example, a taste value indicating a pair of coordinates on a taste map. An image sensibility keyword is a character string that indicates the taste of an image. An image sensibility keyword is, for example, a character string that indicates a taste corresponding to a taste value. The image analyzing unit 20 may determine one or multiple image sensibility keywords in accordance with, for example, the composition of a figure represented in an image, the presence of a human being, the presence of a smile, or the image capturing mode. Note that the taste of an image corresponds to an example of a degree of second impression similarity, and an image sensibility keyword corresponds to an example of a second sensibility keyword.

A template selecting unit 22 has the function of selecting a template that is in harmony with the above-mentioned input image, from a template collection stored in the template storage unit 16, in accordance with the following matching rules. Hereinafter, a process performed by the template selecting unit 22 will be described in detail.

In a first matching rule, the input image is compared with a template. In this case, the template selecting unit 22 selects a template that is in harmony with the above-mentioned input image, from a template collection stored in the template storage unit 16, by using template taste information and image taste information. The template selecting unit 22 may select, for example, a template that has the same taste as the taste of the image. In another example, the template selecting unit 22 may select a template associated with the same template sensibility keyword as the image sensibility keyword. In the case where multiple image sensibility keywords are generated, the template selecting unit 22 selects a template corresponding to each of the image sensibility keywords. In doing so, multiple templates are selected. In yet another example, the template selecting unit 22 may select a template that has a template taste included in a harmonious range of the image taste. The harmonious range is a range defined, for example, with reference to a position corresponding to the taste of the image on a taste map. The size of the harmonious range may be a preset size or may be changed by the user, for example. The template selecting unit 22 may select, for example, a template in which, on the taste map, the difference between a position corresponding to the image taste and a position corresponding to the template taste is less than or equal to a preset value (distance). Alternatively, the template selecting unit 22 may select a template associated with a template sensibility keyword included in the harmonious range of the image sensibility keyword. In the harmonious range, the template selecting unit 22 may select a template in which the difference between a position corresponding to the image sensibility keyword and a position corresponding to the template sensibility keyword is less than or equal to a preset value (distance).

In a second matching rule, the input image is compared with a sample image. In this case, the template selecting unit 22 selects a template that is in harmony with the above-mentioned input image by using sample taste information on a sample image and image taste information. The template selecting unit 22 may, for example, identify a sample image that has the same taste as the image taste, and may select a template in which that sample image is set. In another example, the template selecting unit 22 may identify a sample image associated with the same sample sensibility keyword as the image sensibility keyword, and may select a template in which that sample image is set. In the case where multiple image sensibility keywords are generated, the template selecting unit 22 selects a template in which a sample image corresponding to each of the image sensibility keywords is set. In doing so, multiple templates are selected. In yet another example, the template selecting unit 22 may identify a sample image that has a sample taste included in the harmonious range of the image taste, and may select a template in which that sample image is set. The harmonious range is the same range as the above-mentioned harmonious range. The template selecting unit 22 may, for example, identify a sample image in which, on the taste map, the difference between a position corresponding to the image taste and a position corresponding to the sample taste is less than or equal to a preset value (distance), and may select a template in which that sample image is set. In yet another example, the template selecting unit 22 may select a template in which a sample image similar to the input image is set. The degree of similarity between images is determined by, for example, applying the related art. For example, a feature amount is extracted from each of two images, and the degree of similarity between the images is determined by comparing the feature amounts. Needless to say, the degree of similarity between images may be determined by applying another type of the related art.

In a third matching rule, multiple images are input, and these images are compared with a template. In this case, the image analyzing unit 20 determines the taste of each image, and generates image taste information and an image sensibility keyword of each image. The template selecting unit 22 selects a template by using, for example, image taste information on each image and template taste information. The template selecting unit 22 may select, for example, a template that is in harmony with all the images. In this case, the template selecting unit 22 may calculate the average of the tastes of the multiple images, and may select a template that has the average taste; or the template selecting unit 22 may identify a taste corresponding to the center or centroid of multiple positions corresponding to the multiple image tastes on the taste map, and may select a template that has that taste. The template selecting unit 22 may apply a weighting process to the taste of each image, and may select a template by using the weighted taste of each image. Information regarding this weighting process includes the degree of significance of each image, or the size of each image which is a size to be adopted in a template. For example, a greater weight is assigned to the taste of an image with a higher degree of significance, and a lighter weight is assigned to the taste of an image with a lower degree of significance. Alternatively, a greater weight is assigned to the taste of an image with a larger size, and a lighter weight is assigned to the taste of an image with a smaller size. The degree of significance or the size of each image is input by the user, for example. In another example, the template selecting unit 22 may select a template by using the image sensibility keywords. In this case, the template selecting unit 22 may select a template corresponding to the image sensibility keyword of each image, or may identify a taste corresponding to the center or centroid of multiple positions corresponding to the multiple image sensibility keywords on the taste map, and may select a template that has that taste. Note that the taste of each image corresponds to an example of an individual degree of second impression similarity, and a taste determined on the basis of the tastes of multiple images corresponds to an example of a degree of second impression similarity.

The template selecting unit 22 may select a template in accordance with one of the above-mentioned first to third matching rules, or may combine multiple rules and select a template in accordance with the combined rules.

A rule information storage unit 24 is a storage device such as a hard disk, and stores rule information indicating the above-mentioned matching rules. The template selecting unit 22 selects a template in accordance with a matching rule indicated by the rule information.

A harmonious range information storage unit 26 is a storage device such as a hard disk, and stores harmonious range defining information that defines the above-mentioned harmonious range. The template selecting unit 22 refers to the harmonious range defining information and defines the harmonious range of a taste.

A controller 28 has the function of controlling the operation of each unit of the template management apparatus 10. The controller 28 has, for example, the function of adding, deleting, editing, and displaying a template. The controller 28 stores data on a newly registered template, for example, in the template storage unit 16. The controller 28 also has the function of displaying a template on the terminal apparatus 12. The controller 28 has the function of displaying, on the terminal apparatus 12, a template selected by the template selecting unit 22, the thumbnail image (size-reduced image) of a template, or a template designated by the user.

At the time of editing a template, the user uses the terminal apparatus 12 to edit the details of the image display area or the character string display area. Note that editing includes changes or addition of information. In the character string display area, for example, a character string is entered or changed, the font is set, the size of a character string is set, the color of characters is set, or the arrangement position of characters is changed. In the image display area, for example, an image is added or changed, an image size is changed, or the arrangement position of an image is changed. In addition, the position of the image display area or the character string display area may be changed. With such an editing operation, a compilation that is based on a template is generated.

Figure 3:
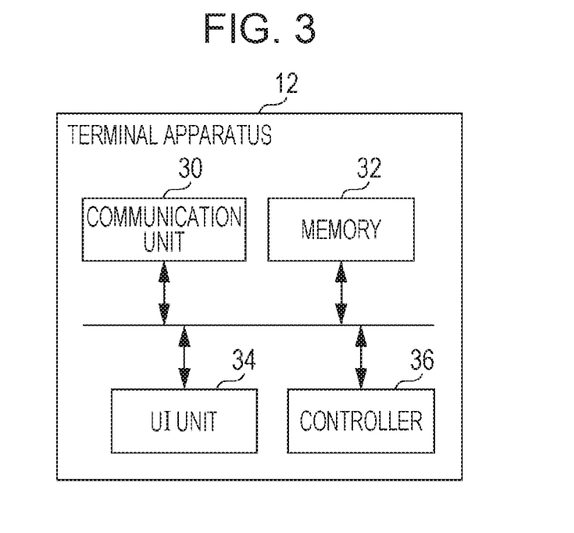
FIG. 3 is a block diagram illustrating a terminal apparatus.

Hereinafter, the terminal apparatus 12 will be described in detail. FIG. 3 illustrates the configuration of the terminal apparatus 12.

A communication unit 30 is a communication interface, and has the function of transmitting data to another apparatus and receiving data from another apparatus via the communication path N. For example, the communication unit 30 receives data on a template transmitted from the template management apparatus 10, and transmits image data to the template management apparatus 10. A memory 32 is a storage device such as a hard disk, and stores programs and data. A UI unit 34 is a user interface, and includes a display and an operation unit. The display is a display device such as a liquid crystal display, and the operation unit is an input device such as a keyboard, a mouse, and/or a touchscreen. A controller 36 has the function of controlling the operation of each unit of the terminal apparatus 12.

Figure 4:
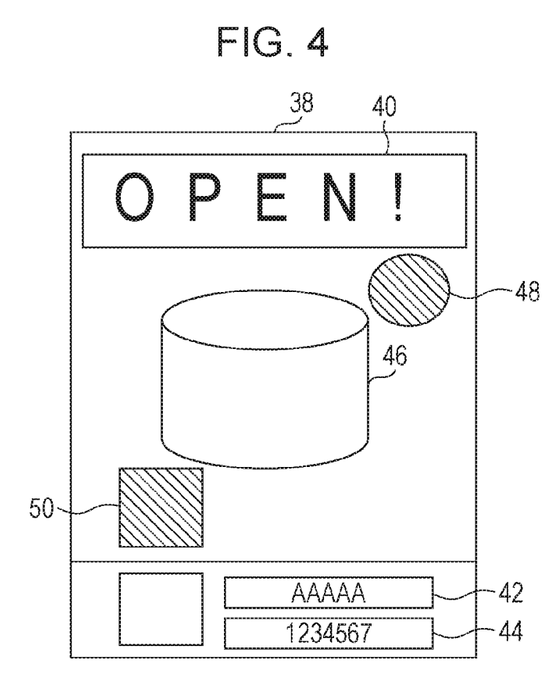
FIG. 4 is a schematic diagram illustrating an exemplary template.

Hereinafter, a template will be described in detail. FIG. 4 illustrates an example of a template. A template 38 includes a background area, character string display areas 40, 42, and 44, and image display areas 46, 48, and 50. A sample image is entered in advance in the background area; a sample character string is entered in advance in each of the character string display areas 40, 42, and 44; and a sample image is entered in advance in each of the image display areas 46, 48, and 50. At the time of editing a template, for example, a list of templates registered in the template management apparatus 10 is displayed on the UI unit 34 of the terminal apparatus 12. When the user selects the template 38 from the list, the template 38 is displayed on the UI unit 34 of the terminal apparatus 12. On the terminal apparatus 12, the user enters a character string in a character string display area, or enters an image in an image display area. Alternatively, the user edits a sample character string, or changes a sample image to another image.

Figure 5:
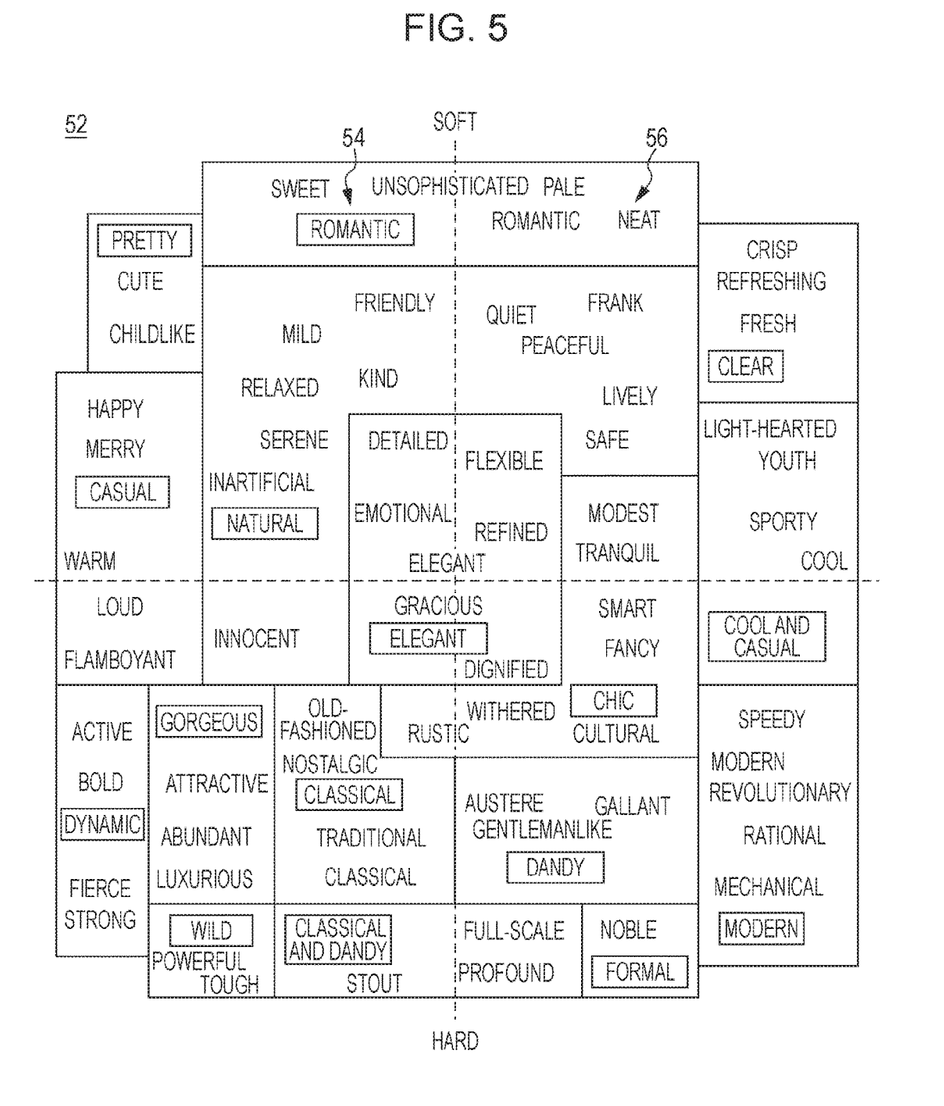
FIG. 5 is a diagram illustrating an exemplary taste map.

Hereinafter, a taste map will be described in detail. FIG. 5 illustrates an example of a taste map. A taste map 52 is, for example, a two-dimensional map defined by two axes. Taste information and a sensibility keyword are associated in advance with each pair of coordinates on the taste map 52. In other words, each pair of coordinates on the taste map 52 corresponds to a taste value indicating a corresponding one of tastes. By specifying a pair of coordinates on the taste map 52, a taste and a sensibility keyword corresponding to that pair of coordinates are identified. On the taste map 52, the horizontal axis is an index axis defining "warm" and "cool", which are taste indices, and the vertical axis is an index axis defining "hard" and "soft", which are taste indices. For example, the taste becomes "cooler" as the area moves to the right. In other words, a taste that is "cooler" is associated with an area nearer the right end. In contrast, the taste becomes "warmer" as the area moves to the left. In other words, a taste that is "warmer" is associated with an area nearer the left end. In addition, the taste becomes "softer" as the area moves up. In other words, a taste that is "softer" is associated with an area nearer the top. In contrast, the taste becomes "harder" as the area moves down. In other words, a taste that is "harder" is associated with an area nearer the bottom.

In the example illustrated in FIG. 5, the taste map 52 is divided into multiple areas, and taste information (such as the taste "romantic" indicated by reference numeral 54) is associated with each area. In addition, a sensibility keyword (such as the sensibility keyword "neat" indicated by reference numeral 56) is associated with each pair of coordinates. The taste map 52 is generated in advance, and data thereof is stored in advance in the taste information storage unit 18. Note that a taste map may be a map with three or more dimensions, or may be a one-dimensional map.

Figure 6:
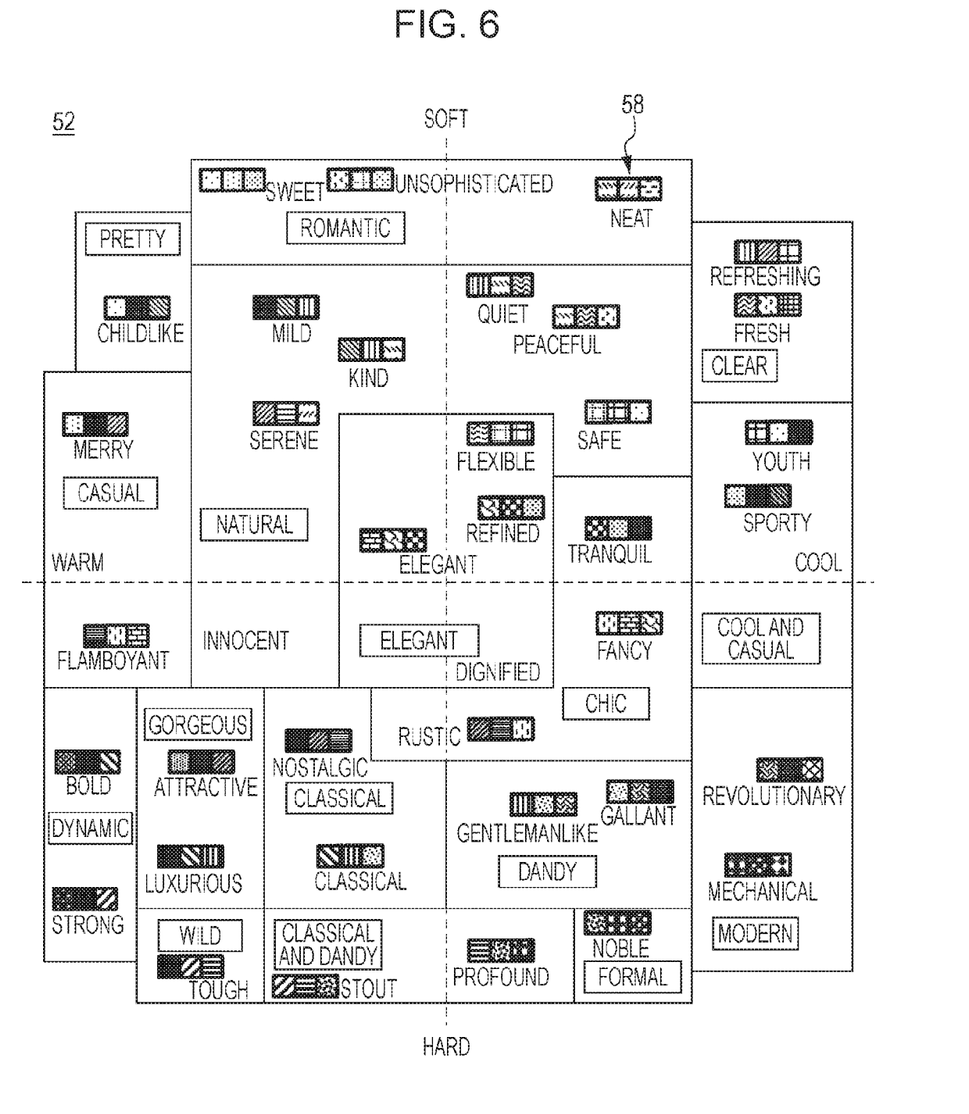
FIG. 6 is a diagram illustrating the exemplary taste map combined with a color palette.

FIG. 6 illustrates another example of the taste map. Taste information and a sensibility keyword are associated with each pair of coordinates on the taste map 52, and additionally a color palette (such as a color palette indicated by reference numeral 58) is associated with each pair of coordinates. A color palette is information indicating the hue or tone of a taste corresponding to the position of that color palette. For example, by using the color palette, the taste of an image or the taste of a template is determined. The image analyzing unit 20 analyzes, for example, the hue and tone of all pixels included in the input image, and, for each combination of the hue and the tone, counts the number of pixels belonging to that combination, and determines a taste corresponding to a combination of the hue and the tone with the greatest number of pixels as the taste of that image. A sensibility keyword corresponding to that taste corresponds to, for example, an image sensibility keyword of that image. In another example, the image analyzing unit 20 may generate, for each combination of the hue and the tone, a circle with a diameter in accordance with the number of pixels on the taste map 52, and may determine a taste corresponding to the centroid of multiple circles as the taste of that image. In yet another example, a taste may be determined using $L^*$, $a^*$, and $b^*$ defined on the coordinates in the Lab color space. The taste of each sample image is determined in advance by the same or similar method. In addition, the taste of a template may be determined in advance by the same or similar method, or may be determined in advance in accordance with the layout or font size of a sample character string, a font type, or the size of a sample image.

Hereinafter, a process performed by the template management apparatus 10 will be described in detail.

Figure 7:
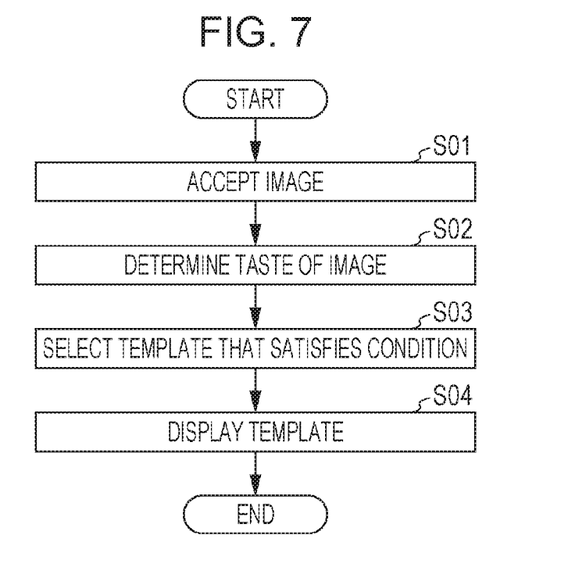
FIG. 7 is a flowchart illustrating a process according to a first example of the exemplary embodiment.

Referring to FIG. 7, a process according to a first example of the exemplary embodiment will be described. FIG. 7 is a flowchart illustrating a process according to the first example of the exemplary embodiment.

At first, the user designates, on the terminal apparatus 12, an image that the user wants to use, and gives a template selecting instruction. Accordingly, data on the designated image and information indicating the template selecting instruction are transmitted from the terminal apparatus 12 to the template management apparatus 10, and are accepted by the template management apparatus 10 (S01). The image analyzing unit 20 determines the taste of the image transmitted from the terminal apparatus 12 by analyzing that image, and generates image taste information and an image sensibility keyword (S02). Next, in accordance with the above-mentioned first or second matching rule, the template selecting unit 22 selects a template that satisfies the condition from a template collection stored in the template storage unit 16 (S03). The template selecting unit 22 may select a template by using template taste information and image taste information, may select a template by using a template sensibility keyword and an image sensibility keyword, or may select a template by using the harmonious range of a taste. Data on the selected template(s) is transmitted from the template management apparatus 10 to the terminal apparatus 12. The selected template(s) is/are displayed on the UI unit 34 of the terminal apparatus 12 (S04). For example, the thumbnail image(s) of the selected template(s) is/are displayed. A list of the selected template(s) may be displayed, or a taste map may displayed on the UI unit 34, and additionally the selected template(s) may be displayed on that taste map.

Figure 8:
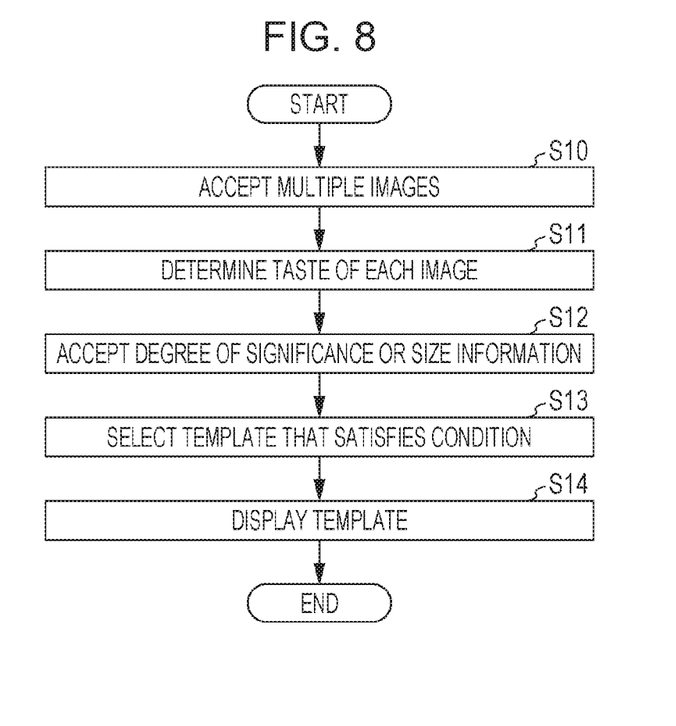
FIG. 8 is a flowchart illustrating a process according to a second example of the exemplary embodiment.

Hereinafter, referring to FIG. 8, a process according to a second example of the exemplary embodiment will be described. FIG. 8 is a flowchart illustrating a process according to the second example of the exemplary embodiment.

At first, the user designates, on the terminal apparatus 12, multiple images that the user wants to use, and gives a template selecting instruction. Accordingly, data on the designated images and information indicating the template selecting instruction are transmitted from the terminal apparatus 12 to the template management apparatus 10, and are accepted by the template management apparatus 10 (S10).

The image analyzing unit 20 determines the taste of each image transmitted from the terminal apparatus 12 by analyzing that image, and generates image taste information and an image sensibility keyword of that image (S11). In addition, the user enters, on the terminal apparatus 12, information indicating the degree of significance or size of each image, and that information indicating the degree of significance or size is transmitted from the terminal apparatus 12 to the template management apparatus 10, and is accepted by the template management apparatus 10 (S12). Next, in accordance with the above-mentioned third matching rule, the template selecting unit 22 selects a template that satisfies the condition from a template collection stored in the template storage unit 16 (S13). Specifically, the template selecting unit 22 applies a weighting process to the taste of each image in accordance with the degree of significance or size, and selects a template by using the weighted taste of each image. In another example, the template selecting unit 22 may calculate the average of the tastes of the multiple images, and may select a template that has the average taste; or the template selecting unit 22 may identify a taste corresponding to the center or centroid of multiple positions corresponding to the multiple image tastes on the taste map, and may select a template that has that taste. In yet another example, the template selecting unit 22 may select a template by using the image sensibility keywords. Data on the selected template(s) is transmitted from the template management apparatus 10 to the terminal apparatus 12. The selected template(s) is/are displayed on the UI unit 34 of the terminal apparatus 12 (S14). Like the first example of the exemplary embodiment, a list of the selected template(s) may be displayed, or the selected template(s) may be displayed on the taste map.

Figure 9:
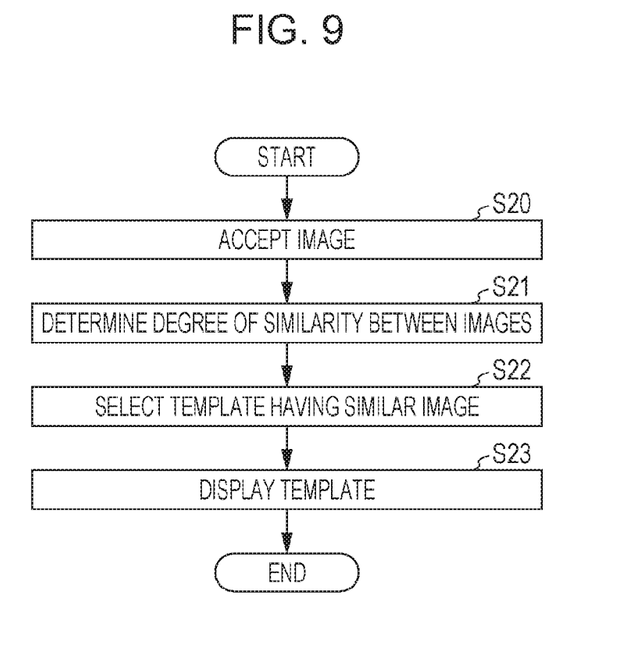
FIG. 9 is a flowchart illustrating a process according to a third example of the exemplary embodiment.

Hereinafter, referring to FIG. 9, a process according to a third example of the exemplary embodiment will be described. FIG. 9 is a flowchart illustrating a process according to the third example of the exemplary embodiment.

At first, the user designates, on the terminal apparatus 12, an image that the user wants to use, and gives a template selecting instruction. Accordingly, data on the designated image and information indicating the template selecting instruction are transmitted from the terminal apparatus 12 to the template management apparatus 10, and are accepted by the template management apparatus 10 (S20). The image analyzing unit 20 determines the degree of similarity between the input image and each sample image set in each template (S21). Next, the template selecting unit 22 identifies a sample image similar to the input image, and selects a template in which that sample image is set (S22). For example, a sample image whose degree of similarity with the input image is greater than or equal to a preset threshold is identified, and a template in which that sample image is set is selected. Data on the selected template(s) is transmitted from the template management apparatus 10 to the terminal apparatus 12. The selected template(s) is/are displayed on the UI unit 34 of the terminal apparatus 12 (S04). Like the first example of the exemplary embodiment, a list of the selected template(s) may be displayed, or the selected template(s) may be displayed on the taste map.

Hereinafter, a process performed by the template selecting unit 22 will be described in detail using specific examples.

Figure 10:
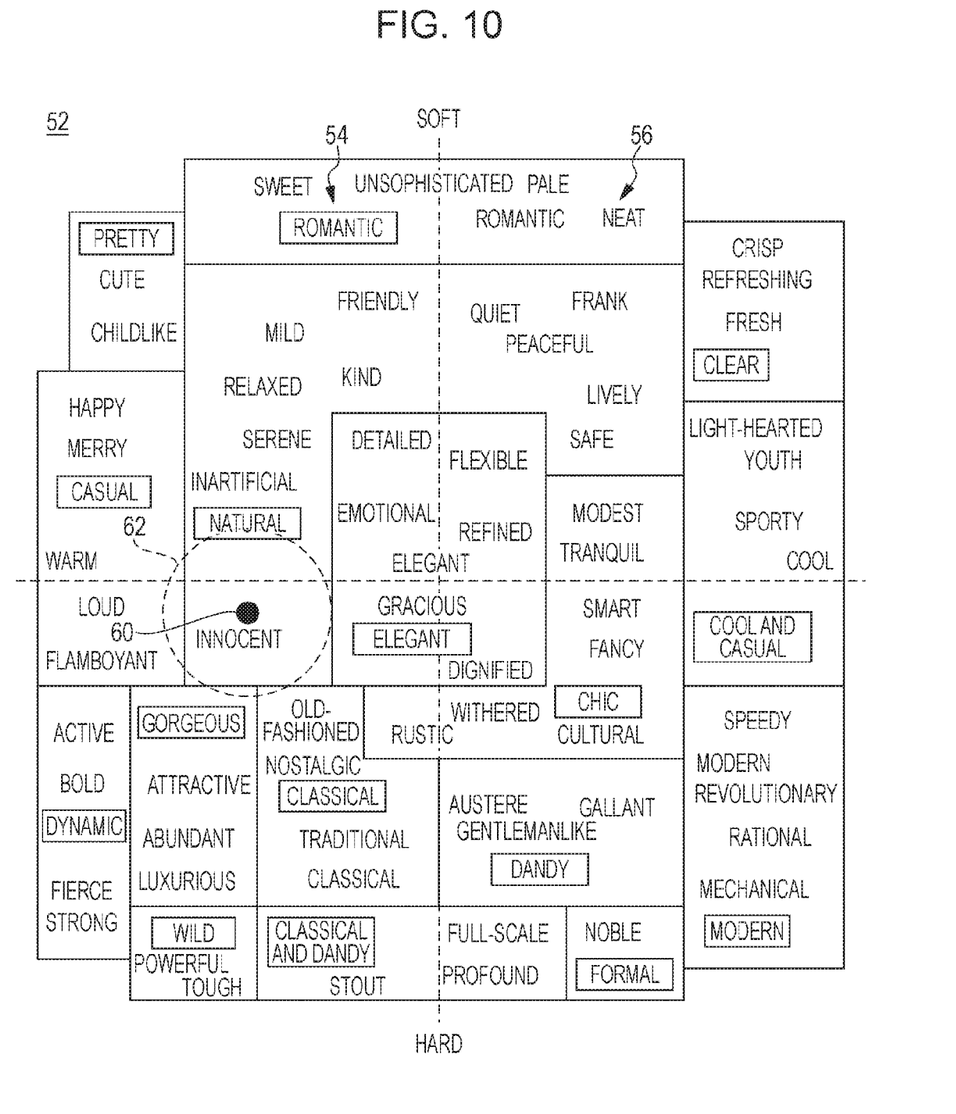
FIG. 10 is a diagram illustrating an exemplary taste map.
Figure 11:
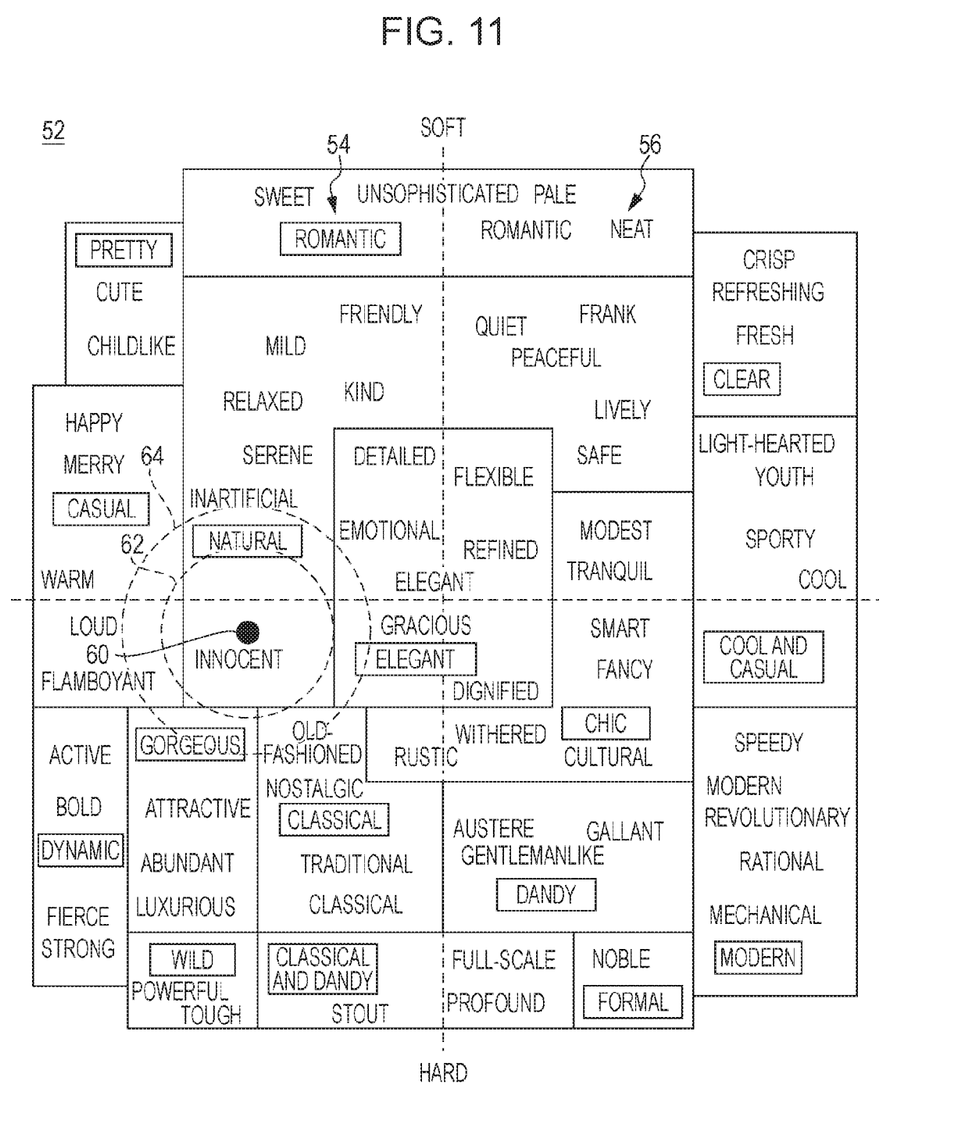
FIG. 11 is a diagram illustrating an exemplary taste map.

Referring to FIGS. 10 and 11, a first specific example will be described. FIGS. 10 and 11 illustrate an example of a taste map. In the first specific example, an image is transmitted from the terminal apparatus 12, and a template is selected on the basis of the taste of that image. Reference numeral 60 in FIG. 10 indicates the taste value (a pair of coordinates corresponding to the taste) of the image transmitted from the terminal apparatus 12. The taste of the image is "natural", and the image sensibility keyword is "innocent".

The template selecting unit 22 may select a template whose taste belongs to the area of the taste "natural", or may select a template that has a taste associated with the pair of coordinates indicated by reference numeral 60. In doing so, a template that has the same taste as the image is selected. In other words, a template that is in harmony with the image is selected.

In another example, the template selecting unit 22 may define a harmonious range 62 of the image taste, and may select a template whose taste is included in that harmonious range 62. In doing so, a template that is in harmony with the image is selected. The harmonious range 62 is, for example, a circular area with a preset diameter around a center position that is the taste value (the pair of coordinates indicated by reference numeral 60) of the image. Needless to say, the harmonious range 62 may be a rectangular area. In addition, the taste value of the image may not necessarily be the center position of the harmonious range. In the example illustrated in FIG. 10, a template whose taste belongs to "natural", a template whose taste belongs to "casual", and a template whose taste belongs to "gorgeous" are selected.

In another example, the template selecting unit 22 may select a template associated with the same template sensibility keyword as the image sensibility keyword "simple", or may select a template whose template sensibility keyword is included in the harmonious range 62. In doing so, a template that is in harmony with the image is selected.

In yet another example, the template selecting unit 22 may identify a sample image whose taste belongs to the area of the taste "natural" and may select a template in which that sample image is set, or may identify a sample image whose taste is included in the harmonious range 62 and may select a template in which that sample image is set. In doing so, a template that is in harmony with the image is selected.

On the taste map 52, the template selecting unit 22 may adopt a taste adjacent to the taste of the image as the taste of a harmonious range. For example, the tastes "casual", "elegant", and so forth that are adjacent to the taste "natural" of the image are adopted as the tastes of a harmonious range. In this case, a template whose taste belongs to "natural", a template whose taste belongs to "casual", and a template whose taste belongs to "elegant" are selected.

The template selecting unit 22 may select, from among multiple templates whose tastes are included in a harmonious range, a template that has a taste closer to the taste of the image (the taste corresponding to the pair of coordinates indicated by reference numeral 60) as a template that has a higher degree of harmony. The template selecting unit 22 forms, for example, multiple concentric harmonious ranges around a center position that is the taste value of the image (the pair of coordinates indicated by reference numeral 60), and selects a template whose taste is included in a harmonious range closer to the center position as a template that has a higher degree of harmony with the image. For example, a template whose taste is included in a harmonious range closest to the center position corresponds to a template whose degree of harmony with the image is "high"; a template whose taste is included in a harmonious range second closest to the center position corresponds to a template whose degree of harmony with the image is "intermediate"; and a template whose taste is included in a harmonious range third closest to the center position corresponds to a template whose degree of harmony with the image is "low". Note that four or more harmonious ranges may be set. On the taste map 52 illustrated in FIG. 11, concentric harmonious ranges 62 and 64 are formed by way of example. The harmonious range 64 is formed surrounding the harmonious range 62. A template whose taste is included in the harmonious range 62 corresponds to a template whose degree of harmony with the image is "high", and a template whose taste is included in the harmonious range 64 corresponds to a template whose degree of harmony with the image is "intermediate". Note that another harmonious range may be formed surrounding the harmonious range 64. A template whose taste is included in this other harmonious range corresponds to a template whose degree of harmony with the image is "low".

Figure 12:
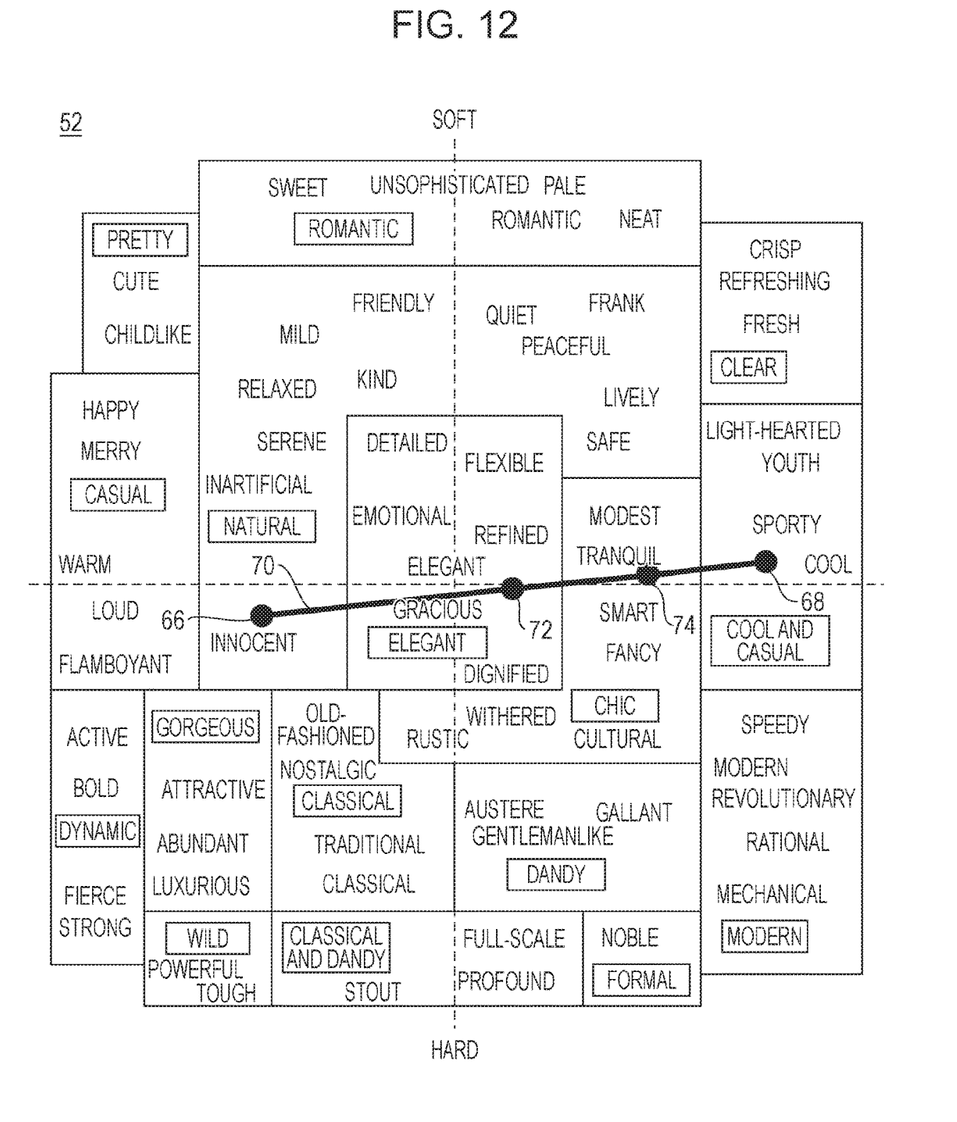
FIG. 12 is a diagram illustrating an exemplary taste map.

Hereinafter, referring to FIG. 12, a second specific example will be described. FIG. 12 illustrates an example of the taste map. In the second specific example, two images are transmitted from the terminal apparatus 12, and a template is selected on the basis of the tastes of those images. Reference numeral 66 indicates the taste value (pair of coordinates corresponding to the taste) of an image A transmitted from the terminal apparatus 12, and reference numeral 68 indicates the taste value of an image B transmitted from the terminal apparatus 12. The taste of the image A is "natural", and the image sensibility keyword is "innocent". The taste of the image B is "cool and casual", and the image sensibility keyword is "sporty".

The template selecting unit 22 forms, for example, a line segment 70 connecting the pair of coordinates indicated by reference numeral 66 and the pair of coordinates indicated by reference numeral 68, and, on the line segment 70, obtains a midpoint 72 between the pair of coordinates indicated by reference 66 and the pair of coordinates indicated by reference numeral 68. A taste corresponding to the midpoint 72 corresponds to the representative taste of the two images. The representative taste is, for example, "elegant". In this case, the template selecting unit 22 may select a template whose taste belongs to the area of the representative taste "elegant", or may select a template that has a taste corresponding to the midpoint 72. In doing so, a template that is in harmony with the two image is selected. In another example, the template selecting unit 22 may obtain a pair of average coordinates of the pair of coordinates indicated by reference numeral 66 and the pair of coordinates indicated by reference numeral 68, and a taste corresponding to the pair of average coordinates as the representative taste. In yet another example, the template selecting unit 22 may adopt, as the representative taste, a taste corresponding to the centroid of the pair of coordinates indicated by reference numeral 66 and the pair of coordinates indicated by reference numeral 68. In yet another example, the template selecting unit 22 may identify a template sensibility keyword corresponding to the midpoint 72, the average position, or the centroid, and may select a template associated with that template sensibility keyword. In the example illustrated in FIG. 12, a template associated with the template sensibility keyword "elegant" is selected.

In the case where the user enters information indicating the degree of significance or size of each of the images A and B, the template selecting unit 22 applies a weighting process to the taste of each of the images A and B in accordance with that degree of significance or size. A taste obtained by this weighting process is adopted as the representative taste, and a template that has the representative taste is selected. For example, in the case where the degree of significance of the image B is higher than that of the image A, the template selecting unit 22 adopts a position 74 closer to the pair of coordinates indicated by reference numeral 68 than the midpoint 72 on the line segment 70 as the representative point, and selects a template that has the representative taste corresponding to the position 74. In the example illustrated in FIG. 12, the representative taste is, for example, "chic". In this case, the template selecting unit 22 may select a template whose taste belongs to the area of the representative taste "chic", or may select a template that has a taste corresponding to the position 74. The template selecting unit 22 determines the representative point in accordance with the difference between or the proportion of the degrees of significance of the images A and B. The higher the degree of significance of the image B than the degree of significance of the image A, a position closer to the pair of coordinates indicated by reference numeral 68 will be selected as the representative point; and the higher the degree of significance of the image A than the degree of significance of the image B, a position closer to the pair of coordinates indicated by reference numeral 66 will be selected as the representative point.

In another example, the template selecting unit 22 may identify a template sensibility keyword corresponding to the position 74, and may select a template associated with that template sensibility keyword. In the example illustrated in FIG. 11, a template associated with the template sensibility keyword "tranquil" is selected.

In the case where the user enters three or more images, the same or similar process is performed to determine the representative taste or the representative point, and a template corresponding to the representative taste or the representative point is selected.

Figure 13:
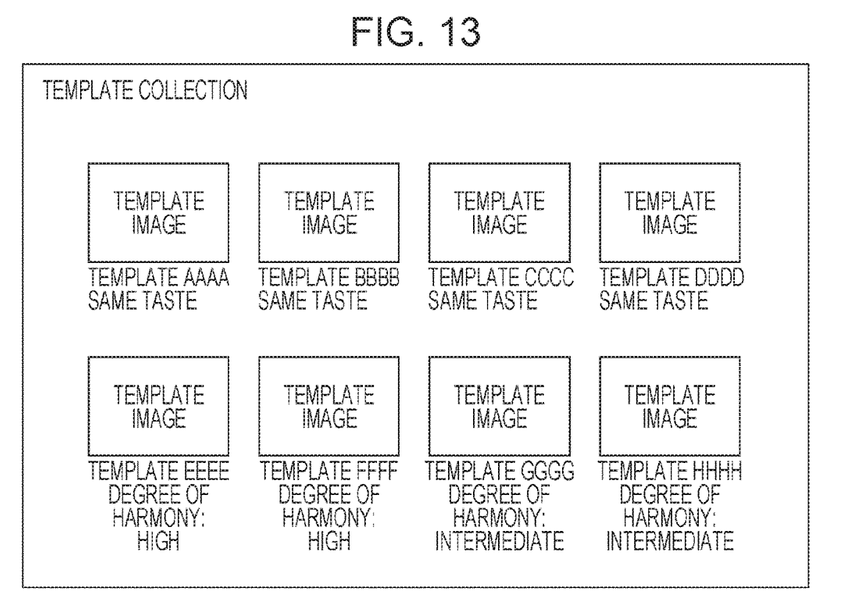
FIG. 13 is a diagram illustrating an exemplary screen displaying a template collection.
Figure 14:
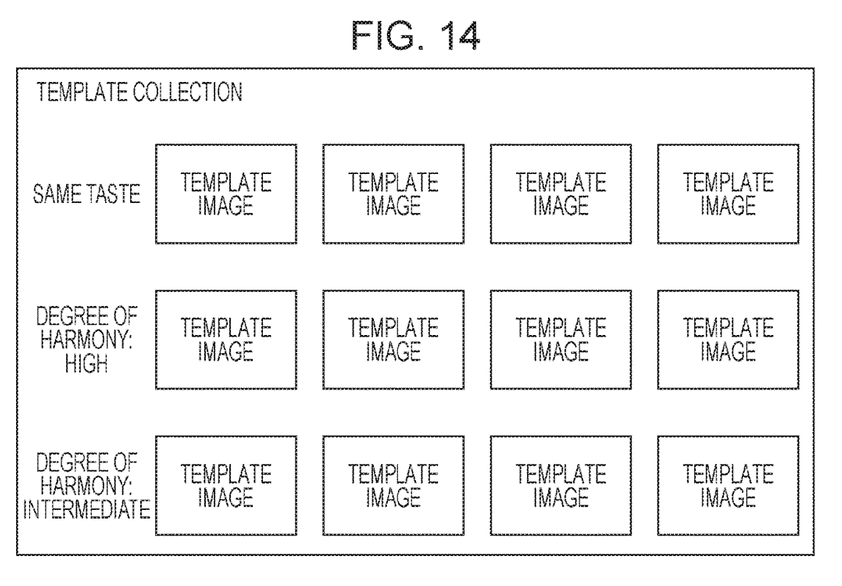
FIG. 14 is a diagram illustrating another exemplary screen displaying a template collection.

Hereinafter, a screen displayed on the UI unit 34 of the terminal apparatus 12 will be described in detail. FIG. 13 illustrates an example of that screen. On the screen, a template collection selected by the template selecting unit 22 is displayed. For example, images of templates that have the same taste as the taste of the image, images of templates whose degrees of harmony with the image are "high", and images of templates whose degrees of harmony with the image are "intermediate" are displayed. FIG. 14 illustrates another example of the screen. Also on the screen, a template collection selected by the template selecting unit 22 is displayed. For example, images of multiple templates that have the same taste as the taste of the image, images of multiple templates whose degrees of harmony with the image are "high", and images of templates whose degrees of harmony with the image are "intermediate" are respectively arranged and displayed. An image of a template is, for example, a thumbnail image. Besides these display examples, a taste map may be displayed on the UI unit 34, and an image of a selected template may be displayed on the taste map. When the user uses the UI unit 34 to select a specific template from the template collection, that template is displayed on the UI unit 34 as a target to be edited.

As has been described above, according to the exemplary embodiment, the taste of an input image is determined, and a template that has the same taste as the taste of the image or a template whose taste is included in a harmonious range is selected. Accordingly, a template that is uniform with the design of the image is selected, compared with the case of selecting a template using the date and time or the position at which the image has been captured. In other words, a template that has the same taste as the taste of the image has no difference or a relatively small difference from the taste (impression) of the image. Thus, that template may be evaluated as a template that is in harmony with the image. In addition, a template whose taste is included in a harmonious range has a relatively small difference from the taste of the image. Thus, that template may be evaluated as a template that is in harmony with the image. Therefore, according to the exemplary embodiment, a template that is uniform with the design of the image, that is, a template that is in harmony with the image, is selected. By selecting a template using sensibility keywords, a selecting process using tastes is supplemented, thereby selecting a template that suits the image. In the case where multiple images are input, a template that is uniform with the designs of these images is selected. By applying a weighting process using the degree of significance of each image, a template that is in harmony with an image that the user considers as particularly significant among the images is selected. In addition, by applying a weighting process using the size of each image, a template that is in harmony with an image that is more striking than the other images is selected. Depending on the set degrees of significance or sizes, no template that is uniform with the designs of all the images may be selected, and a template that is uniform with the design of a particular image may be selected. In this case, a fresh or novel design may be provided to the user.

The above-described template management apparatus 10 is implemented by cooperation between hardware resources and software, for example. Specifically, the template management apparatus 10 includes a processor such as a central processing unit (CPU) (not illustrated). The function of each unit of the template management apparatus 10 is implemented by reading and executing, by the processor, a program stored in a storage device (not illustrated). The above-mentioned program is stored in a storage device via a recording medium such as a compact disc (CD) or a digital versatile disc (DVD), or via a communication path such as a network. Alternatively, each unit of the template management apparatus 10 may be implemented by hardware resources such as a processor and an electronic circuit. In that implementation, a device such as a memory may be used. In another example, each unit of the template management apparatus 10 may be implemented by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a memory that stores a template collection, the memory associatively storing, for each template, the template and a degree of first impression indicating an impression of the template determined on a basis of a taste model, which classifies an impression towards the template into multiple types in accordance with a color characteristic of the template; and
    at least one processor configured to:
        accept an image;
        determine an impression of the accepted image based on a color characteristic of the accepted image and determining a degree of second impression based on a position of the impression of the accepted image on a map indicating a distribution of degrees of impression; and
        select from the template collection, a template that is in harmony with the image by using a degree of second impression indicating the impression of the image, and the degree of first impression by determining the template having a difference between a position corresponding to the degree of second impression and a position corresponding to the degree of first impression of the template on the map less than or equal to a preset value.

2. The information processing apparatus according to claim 1, wherein the at least one processor is further configured to select, from the template collection, a template that has the degree of first impression included in a harmonious range of the degree of second impression as a template that is in harmony with the image.

3. The information processing apparatus according to claim 2, wherein the harmonious range is a range defined with reference to the position corresponding to the degree of second impression, on the map indicating the distribution of degrees of impression.

4. The information processing apparatus according to claim 3, wherein the harmonious range is a range that includes, on the map, a position adjacent to the position corresponding to the degree of second impression.

5. The information processing apparatus according to claim 1, wherein the at least one processor is further configured to accept a plurality of images, and determine an individual degree of second impression for each of the plurality of images and integrates the individual degrees of second impression, thereby obtaining the degree of second impression.

6. The information processing apparatus according to claim 5, wherein the degree of second impression is an average of the individual degrees of second impression, or a degree of impression corresponding to a center or centroid of the individual degrees of second impression on a map indicating a distribution of degrees of impression.

7. The information processing apparatus according to claim 1, wherein the memory further associatively stores, for each template, the template and a first sensibility keyword indicating an impression of the template, the at least one processor is further configured to convert the degree of second impression to a second sensibility keyword indicating the impression of the image, and select, from the template collection, a template that is in harmony with the image by using the first sensibility keyword and the second sensibility keyword.

8. The information processing apparatus according to claim 7, wherein the at least one processor is further configured to select, from the template collection, a template that has the first sensibility keyword included in a harmonious range of the second sensibility keyword as a template that is in harmony with the image.

9. The information processing apparatus according to claim 8, wherein the harmonious range is a range that is defined with reference to a position corresponding to the second sensibility keyword, on a map indicating a distribution of sensibility keywords.

10. An information processing method for a computer including a memory, the method comprising:
    storing a template collection in the memory, the memory associatively storing, for each template, the template and a degree of first impression indicating an impression of the template determined on a basis of a taste model, which classifies an impression towards the template into multiple types in accordance with a color characteristic of the template;

accepting an image;

determining an impression of the accepted image based on a color characteristic of the accepted image and determining a degree of second impression based on a position of the impression of the accepted image on a map indicating a distribution of degrees of impression; and selecting, from the template collection, a template that is in harmony with the image by using a degree of second impression indicating the impression of the image, and the degree of first impression by determining the template having a difference between a position corresponding to the degree of second impression and a position corresponding to the degree of first impression of the template on the map less than or equal to a preset value.

11. A non-transitory computer readable medium storing a program causing a computer to perform a process, the computer including a memory, the process comprising:

storing a template collection in the memory, the memory associatively storing, for each template, the template and a degree of first impression indicating an impression of the template determined on a basis of a taste model, which classifies an impression towards the template into multiple types in accordance with a color characteristic of the template;

accepting an image;

determining an impression of the accepted image based on a color characteristic of the accepted image and determining a degree of second impression based on a position of the impression of the accepted image on a map indicating a distribution of degrees of impression; and selecting, from the template collection, a template that is in harmony with the image by using a degree of second impression indicating the impression of the image, and the degree of first impression by determining the template having a difference between a position corresponding to the degree of second impression and a position corresponding to the degree of first impression of the template on the map less than or equal to a preset value.

* * * * *